United States Patent [19]
Hall et al.

[11] Patent Number: 5,477,122
[45] Date of Patent: Dec. 19, 1995

[54] PLASTIC POWDER IRON PROTECTION COVER OVER FERRITE FOR AN INDUCTIVELY COUPLED CHARGE PROBE

[75] Inventors: John T. Hall, Woodland Hills; Herbert J. Tanzer, Topanga; George R. Woody, Redondo Beach, all of Calif.

[73] Assignee: Hughes Aircraft Company, Los Angeles, Calif.

[21] Appl. No.: 237,563

[22] Filed: Apr. 29, 1994

[51] Int. Cl.$^6$ .................................................. H01M 10/46
[52] U.S. Cl. .................................................................. 320/2
[58] Field of Search ............................................ 320/2, 21

[56] References Cited

U.S. PATENT DOCUMENTS

| | | | |
|---|---|---|---|
| 3,938,018 | 2/1976 | Dahl | 320/2 |
| 4,347,472 | 8/1982 | Lemelson | 320/2 |
| 4,496,896 | 1/1985 | Melocik et al. | 320/2 |
| 5,070,293 | 12/1991 | Ishii et al. | 320/2 |
| 5,157,319 | 10/1992 | Klontz et al. | 320/2 |
| 5,264,776 | 11/1993 | Hulsey | 320/2 |

OTHER PUBLICATIONS

"Plastic–Iron–Powder Distributed–Air–Gap Magnetic Material", Kelley et al., , published by the Department of Electrical and Computer Engineering of North Carolina State University, Aug. 1990.

*Primary Examiner*—Peter S. Wong
*Assistant Examiner*—Edward Tso
*Attorney, Agent, or Firm*—Leonard A. Alkov; W. K. Denson-Low

[57] ABSTRACT

An inductive charging coupler for use in an inductive charging system comprising a charge port into which the coupler is inserted that minimizes damage to its magnetic core. The charging coupler comprises a housing, and a magnetic core disposed in the housing. A primary winding is disposed around the magnetic core. A current conductor is coupled to the primary winding for coupling current thereto. The magnetic core has plastic-ferrite covers disposed on opposite sides thereof. The plastic-ferrite covers are typically bonded to exterior flat surfaces of the magnetic core. The plastic-ferrite covers protect the ferrite core while preserving the magnetic properties of the coupler when it is inserted in the charge port. The plastic-ferrite material exhibits both plastic and ferrite properties and covers and protects the magnetic core in the coupler.

8 Claims, 1 Drawing Sheet

PLASTIC POWDER IRON PROTECTION COVER OVER FERRITE FOR AN INDUCTIVELY COUPLED CHARGE PROBE

BACKGROUND

The present invention relates generally to inductive charging systems, and more particularly, to an inductively coupled probe employed in such inductive charging systems that incorporates plastic and powdered iron protection covers to minimize damage to the core.

The assignee of the present invention manufactures inductive charging systems for use in electric vehicles, and the like. The inductive charging systems employ an inductively coupling probe that forms the primary of the charging system, and a charge port on the electric vehicle that forms the secondary of the charging system. The inductively coupled probe has a ferrite core embedded in the probe that is used to to complete the magnetic path between the charging system and the battery of the electric vehicle. Details of the probe are described in copending U.S. patent application Ser. No. 08/140,954, filed Oct. 25, 1993 entitled "Fixed Core Inductive Charger" assigned to the assignee of the present invention. The ferrite used in the probe is a very fragile material. The probe described in this patent application is inserted and removed from the charge port in the electric vehicle during operation. The ferrite is a fragile ceramic that may be subject to chipping and has a metallic "look" that is not desirable.

One alternative method of protecting the ferrite core is to use a one mil epoxy, or equivalent coating, disposed around the core. However, this may not be adequate for long term usage. It would therefore be desirable to provide a means for preventing damage to the embedded fertile core.

Therefore, it is an objective of the present invention to provide for an inductively coupled probe that incorporates a means for preventing damage to the embedded magnetic core.

SUMMARY OF THE INVENTION

In order to meet the above and other objectives, the present invention provides for protection of a magnetic core or disk used in inductively coupled probes (chargers) that are employed in inductive charging systems for electric vehicles developed by the assignee of the present invention. The present invention uses a plastic-ferrite material that exhibits both plastic and ferrite properties that covers the magnetic core in the probe. The plastic-ferrite material forming the covers preserves the magnetic properties of the probe when it is inserted in a charge port of the inductive charging system.

More particularly, the present invention comprises an inductive charging coupler for use in an inductive charging system that minimizes damage to the magnetic core. The charging coupler comprises a housing, and the magnetic core is disposed in the housing. A primary winding is disposed around the magnetic core, and a current conductor is coupled to the primary winding for coupling current thereto. The magnetic core has plastic-ferrite covers disposed on opposite sides or exterior flat surfaces thereof. The plastic covers are typically bonded to the exterior flat surfaces of the magnetic core. The plastic-ferrite covers protect the magnetic core while preserving the magnetic properties of the coupler when it is inserted in the charge port.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
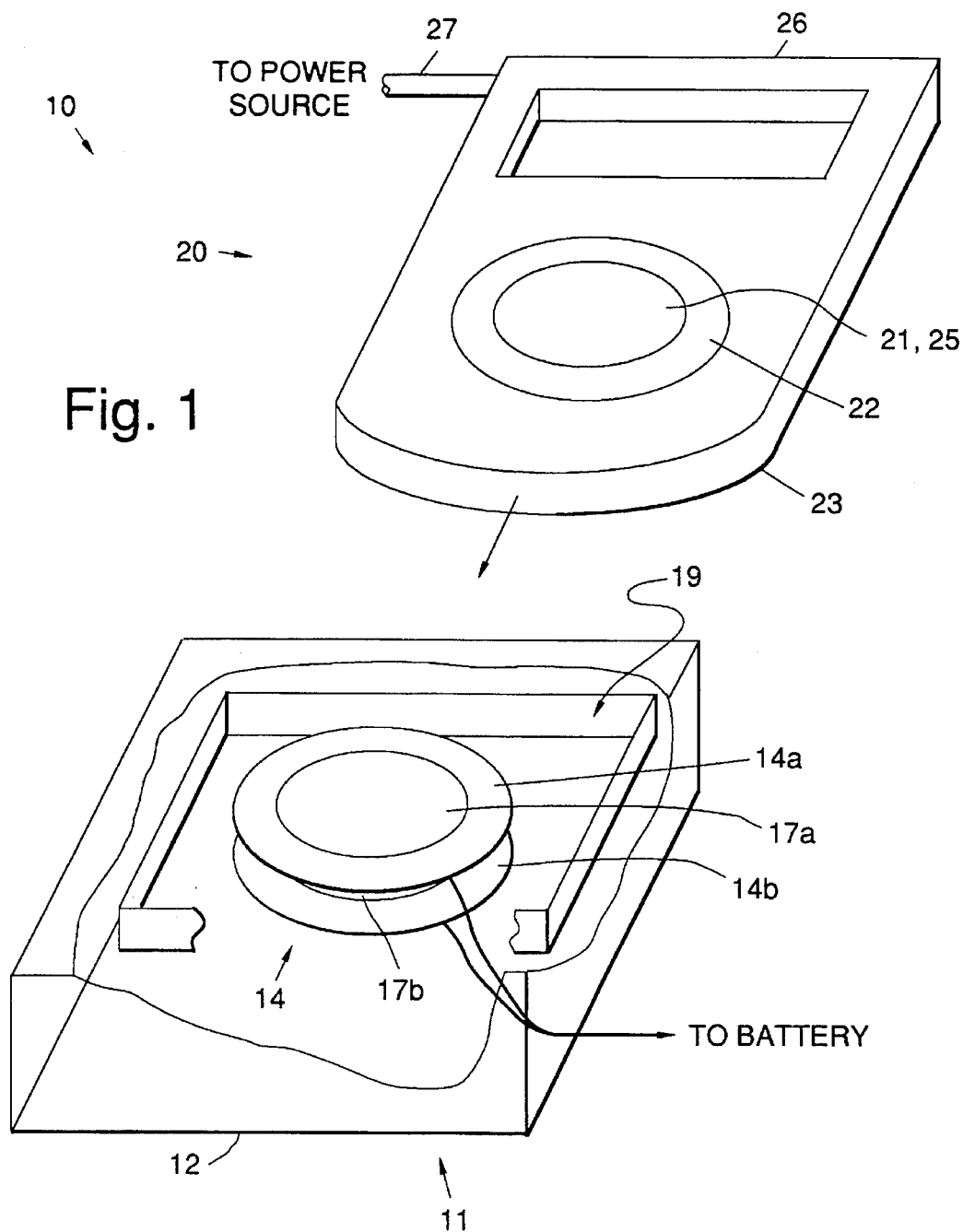
FIG. 1 illustrates a perspective view of of charging apparatus employing a charging coupler having plastic-ferrite covers in accordance with the principles of the present invention.
Figure 2:
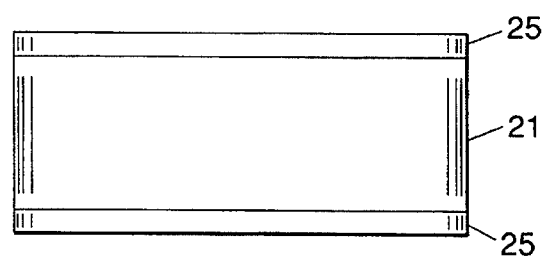
FIG. 2 is an enlarged view of the plastic-ferrite covers and magnetic core used in the charging coupler of FIG. 1.

Referring to the drawing figures, FIG. 1 illustrates a partially broken away perspective view of charging apparatus 10 employing a probe 20 or charging coupler 20 in accordance with the principles of the present invention. The charging apparatus 10 is comprised of a charge port 11 and the charging coupler 20. The charge port 11 includes a housing 12 having an opening 19 into which the charging coupler 20 is inserted. The charge port 11 is coupled to a battery (not shown) of an electric vehicle, for example, in which it is housed. The charging coupler 20 is comprised of a housing 23 having a handle 26, a center magnetic core 21 or "puck" 21, that may be comprised of ferrite, for example. A primary winding 22 is disposed around the center magnetic core 21. A conductor 27, or other current carrying means 27, is coupled to the primary winding 22 and to an external power source (not shown) for coupling energy to the charging coupler 20. The charging coupler 20 is designed to be inserted into the opening 19 of the charge port 11 in order to couple current to the battery from the external power source.

Details regarding the construction of the charging apparatus 10, charge port 11, and charging coupler 20 may be found in U.S. patent application Ser. No. 08/140,954, filed Oct. 25, 1993, entitled "Fixed Core Inductive Charger" assigned to the assignee of the present invention. The present invention is an improvement to this invention and charging couplers used in similar charging apparatus 10, and focuses on the construction of the charging coupler 20 or puck 20.

In general, the charge port 11 includes two magnetic core halves 14a, 14b, that may be comprised of ferrite, for example, that together form a secondary core 14. The magnetic core halves 14a, 14b may be formed in the shape of an "E-core", for example. First and second secondary windings 17a, 17b are disposed adjacent each of the magnetic core halves 14a, 14b. The opening 19 is formed between the respective first and second magnetic core halves 14a, 14b that provides for a predetermined spacing between adjacent surfaces thereof.

The center magnetic core 21 may be comprised of ferrite, for example, around which the primary winding 22 is disposed. The center magnetic core 21 may be configured in a round, square, rectangular, or hexagonal shape, for example, depending upon the geometry of the magnetics design. The center magnetic core 21 and primary winding 22 are enclosed in the housing 23 which may be comprised of plastic, for example, that is in the shape of a wand, or has the handle 26 on it that allows a user to grip it. The center magnetic core 21 in the coupler 20, when inserted into the opening 19 in the charge port 11, forms part of a completed magnetic circuit, and more particularly, provides the center portion of the E-core magnetic design that couples center portions of the magnetic core halves 14a, 14b together.

The inductively coupled probe 20 uses the magnetic core 21 to complete a magnetic path when it is inserted into the charge port 11. The ferrite material comprising the magnetic core 21 is a fragile ceramic that experience chipping and has a metallic look that is not desirable. A plastic look is desired, but a plastic covering is not feasible since this results in an equivalent air gap that is the thickness of the covering material. If non-ferrous covering material is used, its permeability is equivalent to air, approximately 1. The design of the inductively coupled probe 20 can only have an air gap of approximately 30 mils. This 30 mil tolerance is determined by the minimum allowed inductance of the design of the charging system 10, given by the following equation:

$$L_m = \frac{0.4\pi N^2 Ac * 10^{-8}}{2.54 l_{gap}}$$

where $L_m$ is the magnetizing inductance, N is the number of turns in the primary winding 22, Ac is the cross sectional area of the magnetic core 21 in centimeters, and $l_{gap}$ is the air gap in inches.

The air gap is required for insertion tolerance of the probe 20 between the two magnetic core halves 14a, 14b of the secondary core 14 in the charge port 11. Thus there is no spacing allowed for non-ferrous material. A ferrous material is described in an paper by Kelley et al., entitled "Plastic-Iron-Powder Distributed-Air-Gap Magnetic Material", published by the Department of Electrical and Computer Engineering of North Carolina State University (1990). This article describes how a ferrous material, "powdered iron" is distributed in a plastic to produce a ferrous plastic material having a permeability up to 20. The present invention employs this type of material. Accordingly, a 20 rail plastic-ferrite cover 25 is bonded to each of the exterior surfaces of the magnetic core 21. The plastic-ferrite cover 25 comprises a plastic and powdered iron protection cover 25. The plastic-ferrite covers electrically function like 1 mil air gaps. The bottom and top surfaces of the magnetic core 21 are protected by the plastic-ferrite covers 25.

The above equation is a simplified one, and the equation that define a magnetic core 21 having an air gap and a plastic-ferrite cover 25 are:

$$L_m = \frac{0.4\pi N^2 Ac * 10^{-8}}{2.54 \left( \frac{l_m(\text{core})}{\mu_{core}} + \frac{l_{gap}(\text{air})}{\mu_0} + \frac{l_{pf}(\text{plastic ferrite})}{\mu_{pf}} \right)}$$

$$\frac{l_{gap}(\text{air})}{\mu_0} \gg \frac{l_m(\text{core})}{\mu_{core}}$$

Therefore $$L_m = \frac{0.4\pi N^2 Ac * 10^{-8}}{2.54 \left( \frac{l_{gap}(\text{air})}{\mu_0} + \frac{l_{pf}(\text{plastic ferrite})}{\mu_{pf}} \right)}$$

-continued

If $\mu_{pf} = 20$ and $\mu_0 = 1$, then $$L_m = \frac{(0.4\pi N^2 Ac * 10^{-8}}{2.54(l_{gap} + 0.051 l_{pf})}$$

where $l_{pf}$ is the total thickness of plastic-ferrite material in the magnetic path length, $\mu_{pf}$ is the permeability of the plastic-ferrite material=20, $\mu_0$ is the permeability of free space (air)=1, $l_m$ is the total magnetic path length of magnetic core 21, and $\mu_{core}$ is the permeability of the magnetic core 21, typically 5000 for magnesium/zinc (MgZn) ferrite material. The last equation clearly shows that the magnetizing inductance is only slightly altered by the plastic-ferrite covers 25 disposed on each side of the magnetic core 21.

Thus there has been described a new and improved inductively coupled probe employed in such inductive charging systems that incorporates plastic and powdered iron protection covers to minimize damage to the core. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. An inductively charging coupler for use in an inductive charging system that minimizes damage thereto caused by shock, said charging coupler comprising:

a housing;

a magnetic core disposed in the housing;

first and second plastic-ferrite covers disposed on the magnetic core;

a primary winding disposed around the magnetic core; and current carrying means for coupling current to the primary winding.

2. The charging coupler of claim 1 wherein the magnetic core is comprised of ferrite material.

3. The charging coupler of claim 1 wherein the plastic-ferrite covers are bonded to exterior surfaces of the magnetic core.

4. The charging coupler of claim 1 further comprising a handle.

5. The charging coupler of claim 1 wherein the magnetic core has a round shape.

6. The charging coupler of claim 1 wherein the magnetic core has a square shape.

7. The charging coupler of claim 1 wherein the magnetic core has a rectangular shape.

8. The charging coupler of claim 1 wherein the magnetic core has a hexagonal shape.

\* \* \* \* \*